(12) United States Patent
Druzgalski et al.

(10) Patent No.: US 8,578,274 B2
(45) Date of Patent: Nov. 5, 2013

(54) SYSTEM AND METHOD FOR AGGREGATING WEB FEEDS RELEVANT TO A GEOGRAPHICAL LOCALE FROM MULTIPLE SOURCES

(75) Inventors: Adrian Druzgalski, San Francisco, CA (US); Darian Shirazi, Atherton, CA (US)

(73) Assignee: Radius Intelligence. Inc., San Francisco, CA (US)

( * ) Notice: Subject to any disclaimer, the term of this patent is extended or adjusted under 35 U.S.C. 154(b) by 391 days.

(21) Appl. No.: 12/568,595

(22) Filed: Sep. 28, 2009

(65) Prior Publication Data

US 2010/0083124 A1 Apr. 1, 2010

Related U.S. Application Data

(60) Provisional application No. 61/100,687, filed on Sep. 26, 2008, provisional application No. 61/107,635, filed on Oct. 22, 2008.

(51) Int. Cl.
| | | |
|---|---|---|
| G06F 3/00 | (2006.01) | |
| G06F 17/00 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |

(52) U.S. Cl.
USPC ........... 715/738; 715/234; 715/235; 715/236; 715/237; 715/239; 715/240; 715/241; 715/242; 715/254

(58) Field of Classification Search
USPC .................. 715/234–242, 254, 738
See application file for complete search history.

(56) References Cited

U.S. PATENT DOCUMENTS

| | | | | |
|---|---|---|---|---|
| 7,958,125 | B2* | 6/2011 | Yan et al. ....................... | 707/737 |
| 2003/0009564 | A1* | 1/2003 | Eckel ............................. | 709/227 |
| 2005/0097190 | A1* | 5/2005 | Abdelhak ...................... | 709/217 |
| 2005/0228860 | A1* | 10/2005 | Hamynen et al. ............. | 709/203 |
| 2005/0240378 | A1* | 10/2005 | Smith et al. ................... | 702/188 |
| 2006/0004703 | A1* | 1/2006 | Spivack et al. .................... | 707/2 |
| 2006/0173985 | A1* | 8/2006 | Moore .......................... | 709/223 |
| 2006/0184617 | A1* | 8/2006 | Nicholas et al. .............. | 709/203 |
| 2007/0027932 | A1* | 2/2007 | Thibeault ...................... | 707/200 |
| 2007/0127555 | A1* | 6/2007 | Lynch ........................... | 375/142 |
| 2007/0192684 | A1* | 8/2007 | Bodin et al. .................. | 715/513 |

(Continued)

*Primary Examiner* — Kieu Vu
*Assistant Examiner* — Eric J Bycer
(74) *Attorney, Agent, or Firm* — Charles A. Rattner

(57) ABSTRACT

Systems and methods for aggregating web feeds relevant to a geographical locale from multiple sources are disclosed. One embodiment includes, aggregating a web feed using identifier information included in source metadata, parsing the web feed according to mapping information in the source metadata to generate a normalized web feed from the web feed having a data structure specified by the mapping information, determining the geographical locale that is relevant to the web feed, performing filtering on the normalized web feed to determine whether the normalized web feed includes qualified content for publication, and/or publishing the qualified content to be accessible to the user on the user device through a user interface on which the qualified content is depicted as being relevant to the geographical locale.

37 Claims, 21 Drawing Sheets

(56) References Cited

U.S. PATENT DOCUMENTS

| | | | |
|---|---|---|---|
| 2007/0198526 A1* | 8/2007 | Pitkow | 707/10 |
| 2007/0209011 A1* | 9/2007 | Padmanabhuni et al. | 715/762 |
| 2007/0245251 A1* | 10/2007 | Kim et al. | 715/762 |
| 2008/0021976 A1* | 1/2008 | Chen et al. | 709/217 |
| 2008/0097985 A1* | 4/2008 | Olstad et al. | 707/5 |
| 2008/0114749 A1* | 5/2008 | Chandhok et al. | 707/5 |
| 2008/0127133 A1* | 5/2008 | Aghara et al. | 717/140 |
| 2008/0165209 A1* | 7/2008 | Kondo et al. | 345/670 |

* cited by examiner

FIG. 9

Friday, September 04, 2009

Bay Area on the Cheap
Free and affordable things to do in the San Francisco Bay Area

| Home | Cheap Dates | Attractions | Activities | About | Categories | Search this website... | GO |

📰 NEWS FEED  💬 COMMENTS

BROWSE > HOME / EAST BAY, SAN FRANCISCO, SOUTH BAY / FREE GHIRARDELLI CHOCOLATE ON PART - Friday, Sept. 4

Free Ghirardelli Chocolate on BART – Friday Sept. 4

Ghirardelli Chocolate is teaming up with BART to sponsor another Rider Thank You Day on Friday, September 4, 2009. Ghirardelli will pass out 65,000 free individually wrapped chocolate squares along with discount coupons at six BART stations to thank riders for taking BART and nto kick off BART's overnight service from September 4 – 7, due to the Bay Bridge closure.

DEAL: FREE Chocolate for BART riders.

WHEN: Friday, September 4, 2009, 6 am - 9 am.

WHERE: The stations featured in the promotion are Downtown Berkeley, Oakland City Center/12th Street, Embarcadero, Montgomery Street, Powell Street, and Civic Center.

| fwix | Share | Comments | Next | ⓘ 4 NEW stories in SF Bay Area | X |

*FIG. 10C* fwix | Real Time
       | Local News

Home   Explore   Profile   Sign Out

Molly Clark
Person from SF Bay Area, connected through Facebook

Go to profile on FaceBook

This is your personal newspaper!
Customize your profile to showcase the local news you find interesting!

Share: http://fwix.com/Molly_Clark

★ Stats & Rank

1st in SF Bay Area

Stories Broken Today: ④
Stories Broken This Week: ④
Stories Broken All Time: ④

⚡ Broken Stories                                embed

American Rediscovering Their Kitchens
① Seconds ago

Service Issues: Broke-Ass Stuart shares advice on how...
① Seconds ago

Afternoon Palate Cleanser: Puppy Can't Get Up
① 4 min ago

Free Ghirardelli Chocolate on BART
Friday Sept. 4
① 5 min ago

Prev  |  1 – 4 of 4  |  Next

📖 Read Stories                                embed

Afternoon Palate Cleanser: Puppy Can't Get Up
① 4 min ago

Service Issues: Broke-Ass Stuart shares advice on how...
① 5 min ago

Free Ghirardelli Chocolate on BART
Friday Sept. 4
① 8 min ago

Prev  |  1 – 3 of 3  |  Next

Comments
This user has not written any comments...

Similar People

Cory Bergman | David Coulter | Armageddo | Jim Chumley | Karl Hansen

Michael Hinsdale | Jim Chumley | Media Tuner

About | Cities | iPhone | Feedback | Help | Tools | Terms | Privacy

*FIG. 11A* fwix | Real Time Local News

SF Bay Area

Home    Explore    Profile    Sign Out

Not from SF Bay Area? Try a different City

Search news [ ] Submit

Top trends: Power Outage, a year in benefits, benefits of year, more ...

Welcome back, Molly
Go to My Profile | Invite Friends

Now that your Facebook account is connected to Fwix, here's what you can do:

1. Break stories to your friends on Facebook.
2. Check out your profile to see your stats.
3. Enter your email address below to get local updates.

(!) Fiona Ma votes against prisoner releases
San Francisco Guardian Politics – By Tim Redmond  Only a small handful of Democrats voted for the weak prison-reform bill that narrowly passed the state Assembly Aug. 31. Among those joining the entire GOP caucus: Fiona Ma of San ...
4 min ago   🔖 Break | 💬 Comment

[ 1112   1114 ]

[                    ]
[ Post ]

(!) Service Issues: Broke-Ass Stuart shares advice on how...
SF Eater – Broke-Ass Stuart shares advice on how diners should behave in restaurants: don't linger at a table, control wild offspring, tip well, and best of all, ...
18 min ago   🔖 Break | 💬 Comment

Active Stories                                    embed

Free Ghirardelli Chocolate on BART Friday Sept. 4
🕐 2 hrs ago

Headline Writers Have Finally Stopped Referring to Mountain Lions ....
🕐 2 hrs ago About | Cities | iPhone | Feedback | Help | Tools | Terms | Privacy

Add Local News to Your Site

Add Fwix content to your website or blog using our quick and easy widget creator. Simply select your theme, add content, and set a few options.

Select a theme:

◉ Classic Fwix  ○ Simple Grey  ○ Cool Black

Edit the colors of your theme:

| | |
|---|---|
| Header Background | #EAEAEA |
| Header Text | #000000 |
| Story Background | #FFFFFF |
| Story Title | #0062B5 |
| Story Text | #666666 |
| Story Divider | #EAEAEA |

What content should be displayed

- Show stories from: Auto-detect City ▼
- Filter by: No Filter ▼
- Number of Stories: 5 ▼
- If City is Unavailable: Hide Widget ▼

How should your content be displayed

- Header Title: {geo} News
- Show Images: Yes ▼
- Show Summary: Yes ▼
- Show Map: No ▼
- Open Links: In a New Window ▼

Copy Widget Code

```
<script type="text/javascript">
fxw_id = 'fxw_container';
fxw_geo = "";
fxw_filter_type = "";
fxw_filter = "";
fxw_order = 'recent';
```

Preview

Seattle News

The Seattle Police Department's back to school safety tips

Its back to school season again, and most Seattle Public Schools start fall terms this coming Wednesday, September 9. In Queen Anne those schools include Catharine Blaine (I-8), the Center...

The Keeper, Anamanaguchi @ Comet Tavern

Metal and pop punk collided at the Comet Tavern last night! The uniting cause, the annual video game convention, Penny Arcade Expo. Local metal outfit the Keeper played to throngs of convention ...

Esterline shares soar in Friday trading

Shares in Esterline Corp. soared nearly 20 percent in Friday trading after investors cheered the aerospace company's third-quarter results, which were announced Thursday. (ESL)

About | Cities | iPhone | Feedback | Help | Tools | Terms | Privacy

*FIG. 12*

Seattle / Explore

Fwix is a local news site designed to show you the most recent and relevant information in your area. Our mission is to provide people with the best possible news and the tools necessary to spread this news to the people they care about.

| | | | |
|---|---|---|---|
| West Seattle Blog | Daily Weekly | Sound On The Sound | Finest Kiss |
| Seattlest | KPBX | Fremont Universe | KIRO TV |
| Metroblogging Seattle | Seattle Auto | Seattle Bubble | Crown Hill Neighborhood |
| Xconomy | Coo Coo For CoCA Puffs | White Center Blog | Lake City Live |
| King 5 | Ballardite | News Tribune | The Stranger |
| Phinney/Wood | Greenwood Blog | Rain City Guide | My Ballard |
| Northwest Innovation | Sustainable Greenlake | Seattle Condo Review | CHS Capitol Hill |
| Queen Anne View | Lame Stain | Downtown Dispatch | King 5 Video |
| Seattle Weekly | Out For Startdom | Nerds Eye View | Seattle CultureMob |
| B-Town Blog | KOMO Local/Regional | Eating Seattle | Reverb |
| Vintage Seattle | Cliff Mass Weather Blog | Ballard Gossip Girl | Crosscut |
| Serious Eats | Interbay District Blog | Seattle Daily Photo | The South Lake |
| Urbnlivin | The Seattle Times | Seattle Metblog | The Seattle Traveler |
| Pioneer Square News | Seattle Post-Intelligencer | KPLU | Beacon Hill Blog |
| Husky Football | Wallyhood | Northwest Progressive | White Center Now |
| Seattle Hip Hop | Central District News | Seattle Dirt | Seattle Federation |
| Seattle Condo Blog | Seattle PI Blog | Fremont Arts Council | Sweet Seattle Digs |
| Alex Garcia in Seattle | Magnolia Voice | Phinney Neighborhood Blog | Blogging Georgetown |
| At Large Ballad | Mariners Blog | Sound on Sound | Rockout Seattle … |
| Citizen Rain | Seattle Biz Journal | Back Beat Seattle | |

Top Trends
1. Crash On Northbound
2. West Seattle
3. Check Whats
4. Bumbershoot Schedule
5. Music News
6. Weather Rain
7. Mount Vernon
8. New Offices
9. Old Drugs
10. Rule On Kent Teachers
11. Flickr Pool Photo
12. Box In Fife Collects About | Cities | iPhone | Feedback | Help | Tools | Terms | Privacy

*FIG. 13*

SYSTEM AND METHOD FOR AGGREGATING WEB FEEDS RELEVANT TO A GEOGRAPHICAL LOCALE FROM MULTIPLE SOURCES

CLAIM OF PRIORITY

This application claims priority to U.S. Provisional Patent Application No. 61/100,687 entitled "LOCALIZED FEED AGGREGATOR", which was filed on Sep. 26, 2008, the contents of which are expressly incorporated by reference herein.

This application claims priority to U.S. Provisional Patent Application No. 61/107,635 entitled "METHODS SYSTEMS AND DATA STRUCTURES FOR PREDICTING TRENDS OF ONLINE FEEDS", which was filed on Oct. 22, 2008, the contents of which are expressly incorporated by reference herein.

BACKGROUND

Content providers use web feeds to deliver web content, in particular, web content that is regularly updated to users. Users can subscribe to web feeds, which typically include links, headlines, and/or summaries. A user can view the updated content through the feed subscription using a feed reader.

However, with the plethora of online content sources and feeds available for subscription, a user may be inundated with feeds and updates, many of which the user may not be interested in. In particular, a user may be subscribed to several sources of news feeds but only interested in stories that are local or stories that are popular, for example.

BRIEF DESCRIPTION OF THE DRAWINGS

FIG. 9 illustrates an example of a user interface showing published news feeds that are relevant to a particular geographical locale.

FIG. 10A-C illustrate example screenshots of a news item linked by a published web feed and user interface features to share/comment on the news item.

FIG. 11A illustrates an example of a user's home page to a site for accessing published web feeds.

FIG. 11B-C illustrate example screenshots of published news feeds with commenting/sharing features.

FIG. 12 illustrates an example of a user interface showing how access to aggregated web feeds can be added to another site using a widget.

FIG. 13 illustrates an example of a user interface showing an example list of sources from which the web feeds are aggregated for the particular geographical locale.

DETAILED DESCRIPTION

Figure 1:
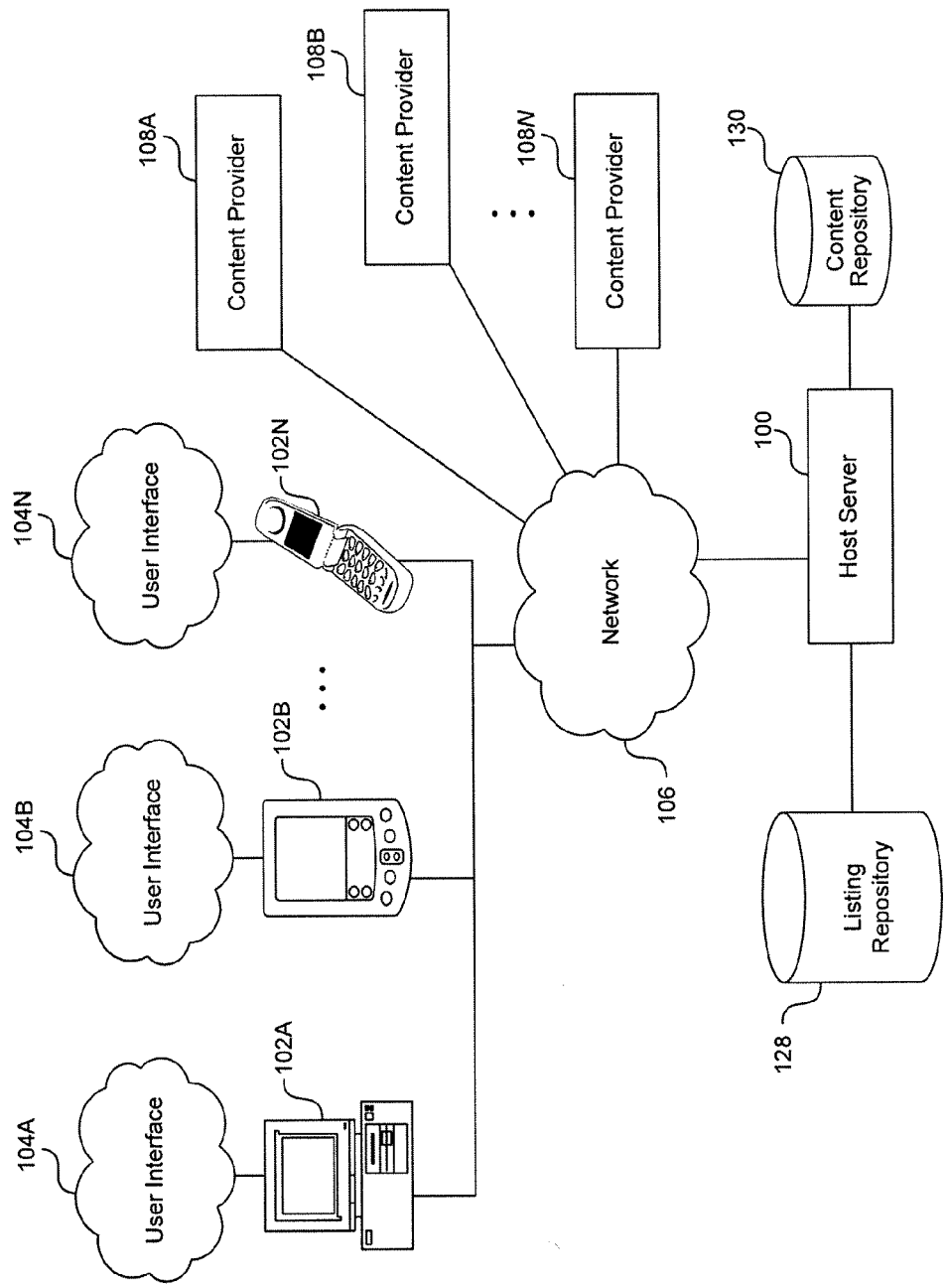
FIG. 1 illustrates a block diagram of client devices coupled to one another and a host server capable of aggregating web feeds relevant to a geographical locale from multiple sources.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for session host controlled joint session for multiple users to experience content, in synchronization or near-synchronization.

FIG. 1 illustrates a block diagram of client devices 102A-N (where N is an integer) coupled to one another and a host server 100 capable of aggregating web feeds relevant to a geographical locale from multiple sources (e.g., content providers 108) over a network 106.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a computer cluster, a mobile computing device such as a notebook, a laptop computer, a handheld computer, a mobile phone, a smart phone, a PDA, a BLACKBERRY device, a TREO and/or an IPHONE, etc. In one embodiment, the client devices 102A-N are coupled to a network 106. In some embodiments, the client devices may be connected to one another.

The network 106, over which the client devices 102A-N couples may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The listing repository 128 and/or the content repository 130 can store software, descriptive data, images, system information, drivers, and/or any other data item utilized by parts of the host server 100 for operation. The repositories 128 and 130 may also store user information and user content, such as, user profile information, user preferences, content information, network information, information/metadata about content sources, raw content, filtered content, etc. The repositories 128 and 130 may be managed by a database management system (DBMS), for example but not limited to, ORACLE, DB2, MICROSOFT ACCESS, MICROSOFT SQL SERVER, POSTGRESQL, MYSQL, FILEMAKER, MONGODB, COUCHDB, TOKYO CABINET, etc.

The repositories 128 and 130 can be implemented via object-oriented technology and/or via text files, and can be managed by a distributed database management system, an object-oriented database management system (OODBMS) (e.g., CONCEPTBASE, FASTDB MAIN MEMORY DATABASE MANAGEMENT SYSTEM, JDOINSTRUMENTS, OBJECTDB, etc.), an object-relational database management system (ORDBMS) (e.g., INFORMIX, OPENLINK VIRTUOSO, VMDS, etc.), a file system, and/or any other convenient or known database management package. An example set of data to be stored in the repositories 128 and 130 is further described with reference to FIG. 2.

The host server 100 is, in some embodiments, able to communicate with client devices 102A-N and the content providers 108A-N via the network 106. In addition, the host server 100 is able to retrieve data from and/or store data in the repositories 128 and 130. The host server 100 can be implemented on a known or convenient computer system, such as is illustrated in FIG. 11. The host server 100 is described in more detail with reference to FIG. 2-3.

The content providers 108A-N are coupled to the network 106. The content providers 108A-N can be implemented on a known or convenient computer system, such as is illustrated in FIG. 15. The content providers 108A-N can be a third party site, for example, including but not limited to, social networking sites, news sites, blogs, forums, etc. The content providers 108A-N have content (e.g., articles, images, movies, music, TV shows, feeds, news feeds, etc.) to be provided to users for access via a user interface provided by the host server 100. Example screenshots of the user interfaces are illustrated with further reference to the examples of FIG. 9-14.

There could be any number of content providers 108 coupled to the network 106 that meet these criteria. The content providers 108 make content available to appropriately configured clients coupled to the network 106. The content may have any applicable known or convenient form (e.g., multimedia, text, executables, video, images, audio, etc.), and may or may not be in appropriate form for delivery to a client through a browser (e.g., on web pages). Users of client devices 102 can access content (e.g., web feeds, news feeds), through any applicable known or convenient interface, from the content provider 108 through the host 100, which aggregates the web feeds from the multiple providers 108 and performs filtering.

In the example of FIG. 1, in operation, the host server 100 aggregates web feeds that are relevant to a geographical locale from multiple sources (e.g., content providers 108). The web feeds generally include news feeds that are temporally relevant to the time of access of the web site through which the news feeds are published. In addition, the web feeds are generally spatially relevant to a user's geographical location in real-time/near real time, or a user's specified geographical location.

The aggregation can be performed in a distributed fashion by multiple machines or engines within the host server 100. In this manner, each machine or engine is responsible for aggregating feeds from different sources (e.g., different content providers 108A-N) to aggregate feeds from more sources over a shorter period of time. Distributed aggregation using multiple machines can allow web feeds with time sensitivity (e.g., news feeds) to be aggregated in real time or near real time.

The host server 100 can, in one embodiment, analyze the web feeds (e.g., news feeds) and perform selective filtering to ensure that the published feeds are geographically relevant and/or temporally relevant. Moreover, filtering can also be performed to ensure the quality of the content or news content. For example, feeds with corrupt code (e.g., corrupt HTML code), feed data with broken links, out-of-date data, feeds with incomplete information can be removed and/or otherwise prevented from publication to a user. The host server 100 can also identify one or more images and/or selectively perform image filtering to publish an image with a published feed. The functions and features associated with the host server 100 are described with further reference to the examples of FIG. 2-3.

An ad server 110 may also be coupled to the network 106. The host server 100 can communicate with the ad server 110 to publish promotional content through the user interface on which the aggregated news feeds are published. The host server 100 can place advertisements based on the content of the published news feeds and/or publish advertisements from partnerships with advertisers.

Figure 2A:
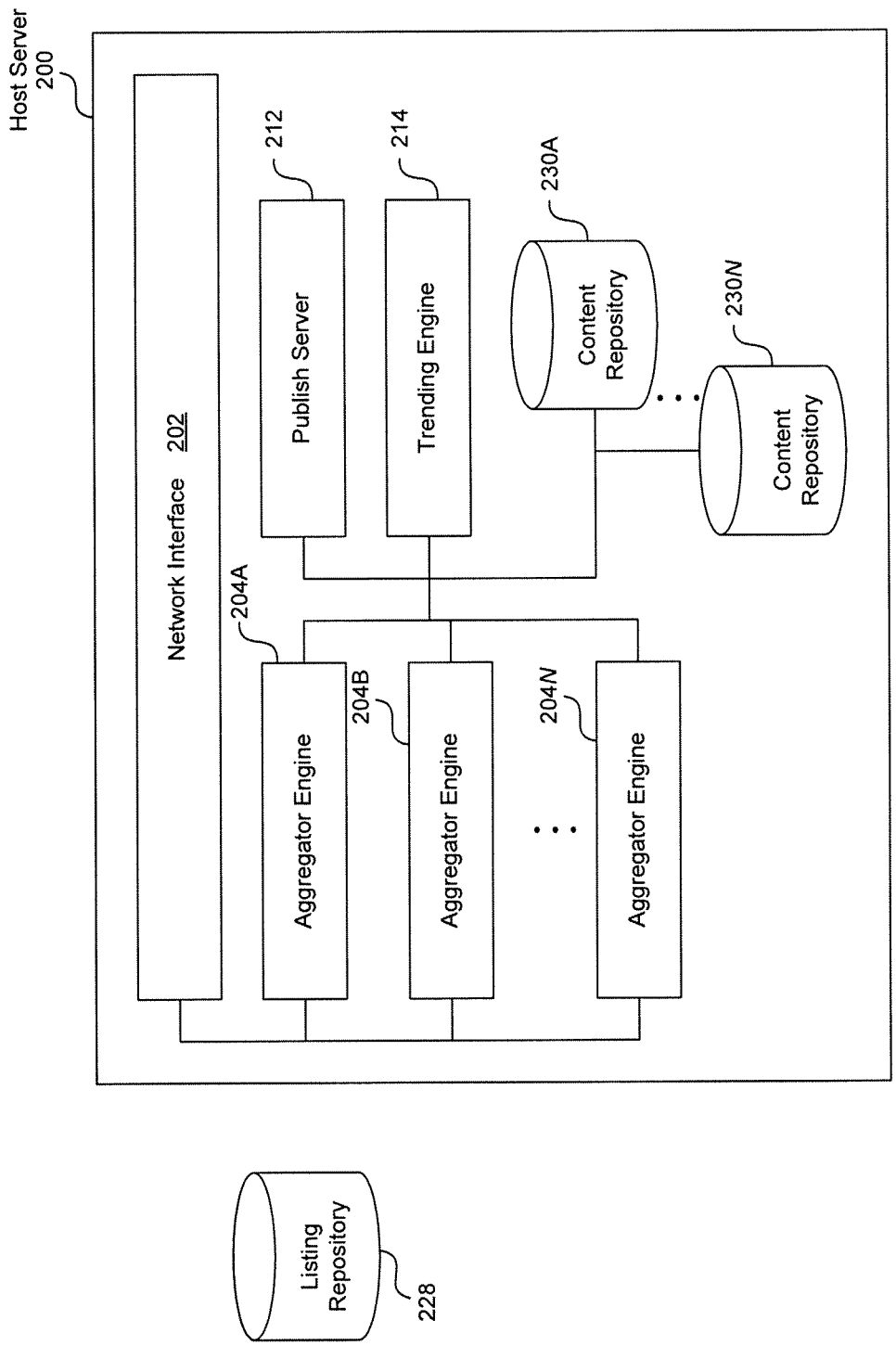
FIG. 2A depicts a block diagram illustrating a host server for aggregating web feeds relevant to a geographical locale.

FIG. 2A depicts a block diagram illustrating a host server capable of providing a joint session for multiple users to experience content via multiple devices.

In the example of FIG. 2A, the host server 200 includes a network interface 202, an aggregator engine 204, a publish server 212, and/or a trending engine 214. The host server 200 can include one, or more than one aggregator engine 204 as shown in the example. The aggregator engine 204 is further illustrated with reference to the example of FIG. 2B.

The host server 200 can include a listing repository 228 and/or a content repository 230. The host server 200 may be communicatively coupled to the listing repository 228 and/or the content repository 230 as illustrated in FIG. 2. In some embodiments, the listing repository 228 and/or the content repository 230 are partially or wholly internal to the host server 200.

In the example of FIG. 2, the network controller 202 can be one or more networking devices that enable the host server 200 to mediate data in a network with an entity that is external to the host server, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

A firewall, can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure. In some embodiments, the functionalities of the network interface 202 and the firewall are partially or wholly combined and the functions of which can be implemented in any combination of software and/or hardware, in part or in whole.

One embodiment of the host server 200 includes one or more aggregator engines 204. The aggregator engines 204 can be implemented, example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The aggregator engines 204 can be any combination of hardware components and/or software agents able to aggregate web feeds from various sources using source metadata. Feeds can include by way of example but not limitation, RSS feeds, Atom, JSON, raw XML, etc. The aggregator engines 204 can use, for example, identifier information in the source metadata to identify the location of the web feed. For example, the identifier information can include a location identifier such as a URI or URL. In one embodiment, the aggregator engines 204 are coupled to the listings repository 228. The listings repository 228 can store listings of sources (e.g., content providers in the example of FIG. 1) from which content or feeds can be collected. The listings repository 228 can store, for example, in conjunction with source listings, source metadata.

Source metadata can include multiple fields, by way of example but not limitation, identifier information (e.g., location identifier (e.g., URL, URI, etc.), unique identifier, a short name, a pretty name), a geographical identifier with geographical information, etc. The geographical identifier typically corresponds to a geographical table having time zones, state, zip codes, airport IDs, etc. In addition, the source metadata can include a field for indicating whether the source is used in the aggregation (e.g., a field that indicates whether the source is active/non-active). In some embodiments, the source metadata can also include a field with a short description of the source, a URL construct field, a latitude field and a longitude field. The construct field is a URL mapping to include geographical locations identifiers in a URL. For example a URL with a geographical location identifier may be of the form "source.com/%s" where the "%s" can be associated with a geographical location (e.g., SF, LA, Seattle, etc.).

The latitude/longitude field can store the location of the actual story or referenced by the actual story. This is different form the geographical location field since the geographical location field typically corresponds to a region (e.g., city, state, neighborhood, etc.) rather than a specific point such as that referenced by longitude/latitude data points. The data in the latitude/longitude field can be used and checked against the geographical location to verify that the story is relevant to the geographical location (e.g., the longitude/latitude is within a specific distance compared to the geographical location).

Figure 2B:
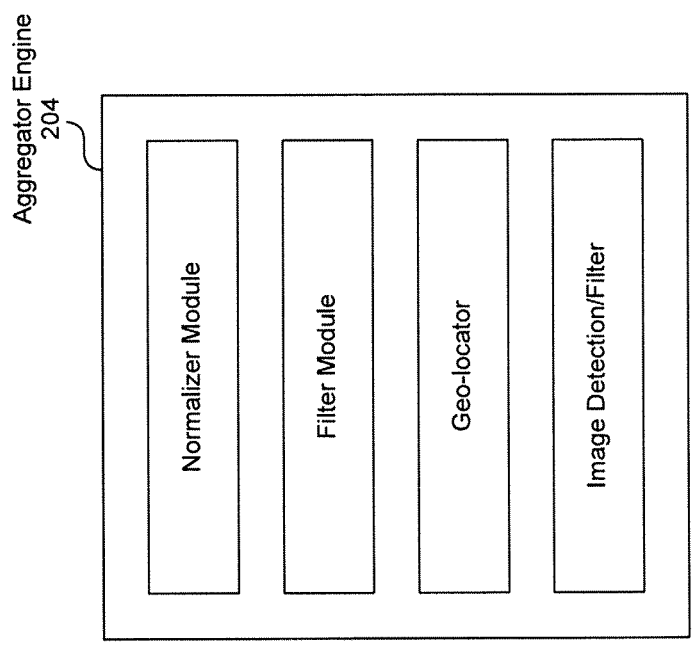
FIG. 2B depicts a block diagram of the aggregator engine in the host server.

In one embodiment, the source metadata includes mapping information which specifies a data structure. For example, the aggregator engines 204 can parse the collected web feed according to mapping information contained in the source metadata. In this manner, the aggregator engines 204 can generate the normalized web feeds that have a consistent data structure specified by the mapping information. In one embodiment, the aggregator engine 204 includes a normalizer module as shown in the example of FIG. 2B, which normalizes the web feeds into a particular data structure (e.g., the data structure specified by the mapping information).

The data structure specified in the mapping information typically includes multiple fields, including but not limited to, a unique ID for a story, a title for the story, a link to an image (e.g., a location identifier for an image), one or more tags, a video link, a summary field for the story, unassigned fields, a field to specify the author, a link (e.g., a URL to the story rather than the source), a field with information used for ranking, a field with a date (e.g., the date the story or feed was published/drafted), a field for the source name, geographical data.

In addition, the data structure can include a field to specify a source identifier, a time stamp (e.g., to indicate when the story/feed was aggregated), a geographical identifier, an address identifier (e.g., an address included with the source), a story rank, a field to indicate whether the story has been published or not, a short name of the source, a topic identifier to specify the category, and/or a field to specify whether the story is active or not. The data structure can also include fields where popularity or trending information can be stored. For example, a field can be used to indicate number of clicks that the story has received, etc.

Note that the normalization into the data structure can be performed by automatically crawling the web feed and analyzing each field. For example, the crawler can use a probabilistic model in assigning fields in the web feed into the data structure specified by the mapping information. In one embodiment, certain tags in a web feed can be determined to correspond to specified fields in the normalized data structure approximately a certain percentage of the time. The percentage can be determined based on collecting statistical information. For example, the tag 'summary' in the feed may be determined to correspond to the summary field in the normalized data structure ~60% of the time or the tag 'description' may correspond to the summary field ~40% of the time. Such a probabilistic model can be used to automatically map feeds to the normalized data structure.

In addition, heuristics can be used to perform the mapping. For example, if the web feed only has a single field with textual data, then that field is mapped to the title field in the normalized data structure. If there are two fields with text, then the larger is typically the summary and the shorter is typically the title. A field with an URL can be mapped to a link field in the normalized data structure, for example.

In one embodiment, a human editor performs some or all of the mapping to generate the normalized web feed, for example by clicking on links in a feed/story, determining whether the story is local, evaluating whether the story is interesting, etc. The automated crawler can be used in conjunction with human editing for the mapping into the normalized data structure.

One embodiment of the host server 200 includes multiple aggregator engines 204A-N. In this instance, each of the multiple aggregator engines 204A-N is assigned a subset of the sources listings. Each aggregator then collects the web feeds from the assigned sources using the information contained in the listings repository. The listings can be assigned to the aggregator engines 204A-N such that the load is balanced (e.g., each aggregator 204 is assigned an approximately the same number of listings from which web feeds are collected). Moreover, the aggregators 204 store the data in a local cache for future use such that data that has already been fetched need not be obtained again to conserve bandwidth usage. Therefore, the aggregators 204 store data in cache such that only new data is collected from the sources.

The aggregator engine 204 can determine the geographical locale that is relevant to the web feed. The aggregator engine 204 can parse through the normalized web feed (e.g., in the title, summary, the article itself, or other portions of the web feed) to detect location key words. Location keywords can be any words which may indicate the presence of an address or other type of location identifier. For example, location keywords can include, 'St./Street', 'Dr./Drive', 'Blvd./Boulevard', 'th', 'ln./lane', etc. Keywords to detect can also include 'at', 'on', 'near', 'in', 'close to', 'in proximity', etc. Using, the location keywords, the aggregator engine 204 can identify an address referenced in the normalized web feed.

For example, in an article, if the aggregator engine 204 detects the following location keywords "happened at 3rd St. and Market St. in San Francisco", the engine 204 can extract the address "3rd", "Market", and "San Francisco". The aggregator engine 204 can thus lookup the extracted address in a text file or via a third party mapping/location service (e.g., GOOGLE MAPS), for example, to obtain geographical data such as, GPS coordinates, longitude/latitude data set, etc. Such geographical data can be used to determine the geographical locale (e.g., which may be a neighborhood, a city, a county, a state, a province, a region, etc.). In some instances, the aggregator engine 204 includes a geo-locator as shown in the example of FIG. 2B that determines the location or a relevant locale to the web feed.

In one embodiment, the aggregator engine 204 performs filtering on the normalized web feed to determine whether the normalized web feed includes qualified content for publication. The aggregator engine 204 can include a filter module as illustrated in the example of FIG. 2B and performs one or more of the filtering procedures. The filtering performed can include one or more processes performed in parallel or in sequential order.

For example, the aggregator engine 204 can determine content/stories in the normalized web feed with obscenities or profanities. Content with identified obscenities or profanities are typically disqualified from publication to a user. In addition, the engine 204 can identify ad links in the normalized web feed. Generally, the content/story with an ad link is also disqualified from publication. In one embodiment, the disqualified content is retained in the cache such that it does not get aggregated again in the future. In addition, disqualified content is typically not retained in storage. In one embodiment, the ad detection is performed after the filtering for obscenities or profanities. Ad detection may also be performed prior to filtering out content with obscenities or profanities.

The aggregator engine 204 can identify content/story in the normalized web feed with corrupt data (e.g., corrupt HTML code or broken links) or unrecognizable characters, for example, to clean up the content to generate a valid feed for publication. The corrupt data is typically salvaged or removed. For example, if the summary is partially corrupt, then the corrupt portions may be discarded. In some instances, if the title is corrupt and cannot be salved, then the story may be removed. In addition, the aggregator engine 204 removes JAVASCRIPT before publication. In one embodiment, the aggregator engine 204 extracts timing data (e.g., in a timestamp) from the normalized web feed and uses the timing data to determine whether the web feed includes content that is temporally relevant.

Moreover, the aggregator engine 204 can identify an image to be associated with a published web feed. One embodiment of the aggregator engine 204 includes an image detector/filter module can perform some or all of the image identification and association processes. The image is generally published on a user interface as being associated with the web feed/qualified content. The image can be identified from the normalized web feed itself, for example, using a link to an image contained in the normalized web feed. If the normalized web feed does not include an image or a link to an image, the aggregator engine 204 searches for content that were removed in the filtering process for any images.

An additional image filtering process can be performed by the aggregator engine 204 as well. For example, the extracted images can be further filtered for ads, junk icons, banner ads, etc. The image filter can be applied using dimensions of the images to determine presence of advertisements or icons in the images. In addition, the aggregator engine 204 can perform character recognition to detect text in the images to determine presence of advertisements in the images to be removed, for example. In one embodiment, the aggregator engine 204 goes to the link to the content/story in the web feed and scrapes the HTML for images to search for images to publish with the feed. The images thus detected can be filtered using image filters as well. In one embodiment, the aggregator engine 204 stores the filenames of extracted images and uses frequently occurring filenames as filters. For example, names that occur frequently (e.g., ad.jpg) may be an indicator that the image is an icon or an ad.

One embodiment of the host server 200 includes one or more content repositories 230A-N. The qualified content/stories/feeds and associated images thus obtained are stored by the aggregators 204 in the content repository 230A. In some embodiments, the host server 200 includes multiple content repositories 230A-N to store the feeds or valid/qualified stories redundantly. For example, each of the multiple content repositories 230A-N can be individually coupled to all of the multiple aggregator engines 204 such that each repository 230 stores all the content aggregated and processed by each of the aggregators 204. Multiple redundancies ensure that in the event that a repository malfunctions, the remaining repositories stores additional copies of the same data. In addition, with more repositories, more simultaneous connections can be supported to ensure real time or near real time content delivery to end users.

One embodiment of the host server 200 includes a publish server 212 coupled to the one or more content repositories 230A-N. The publish server 212 can be implemented, for example, as software embodied in a computer-readable medium or computer-readable storage medium on a machine, in firmware, in hardware, in a combination thereof, or in any applicable known or convenient device or system. The publish server 212 can be any combination of hardware components and/or software agents able to publish the qualified stories accessible to a user through a user interface.

Figure 9:
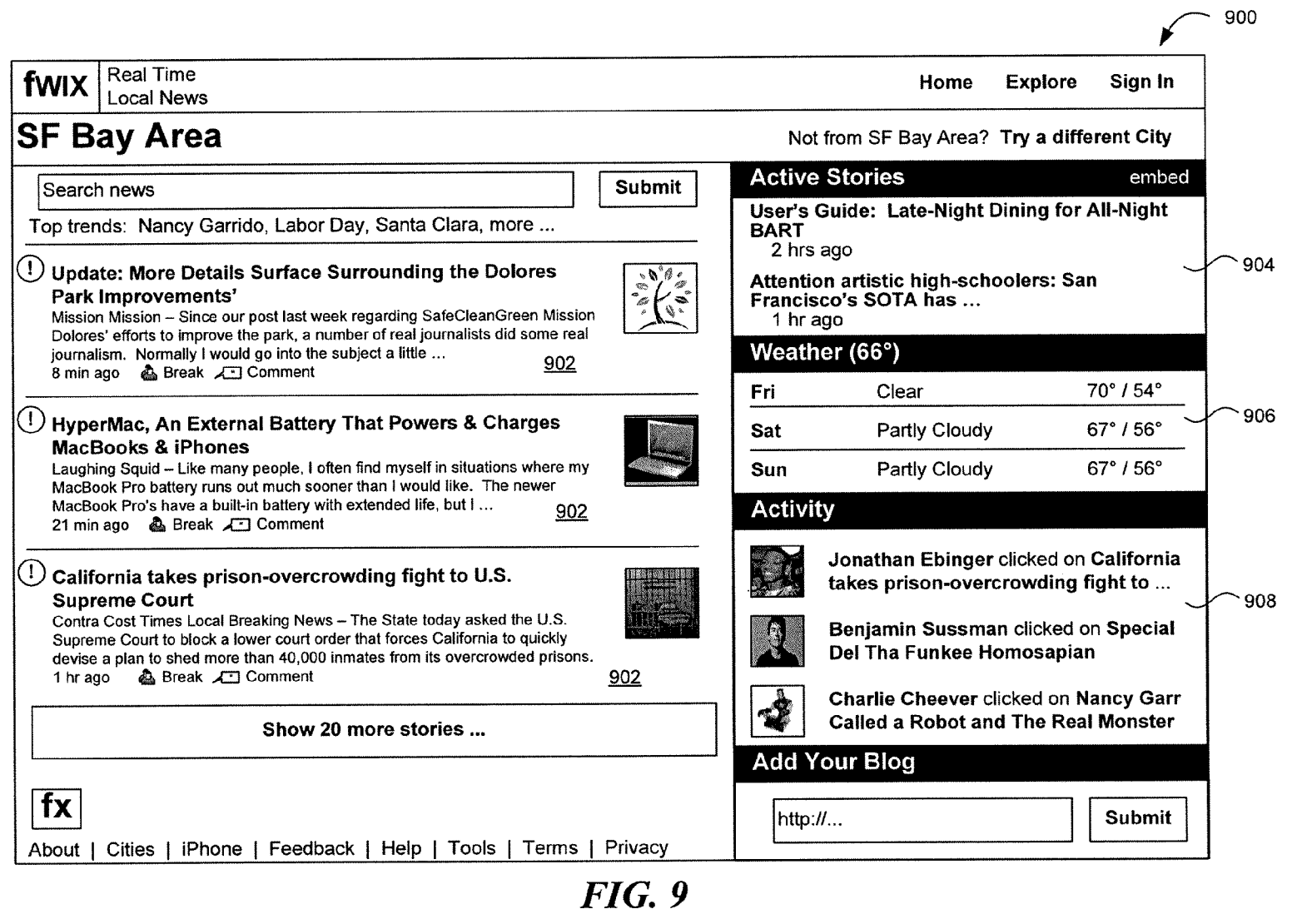

The publish server 212 typically publishes the stories in a user interface in a manner such that the stories are shown to be relevant to a particular geographical locale. An example of a user interface showing news feeds relevant to a particular locale is shown in FIG. 9. Each user can be associated with a default geographical locale which is reconfigurable by the users. Example features in the user interface is described with further references to the examples of FIG. 9-14.

In addition, the publish server 212 publishes stories or feeds as being associated with an image. The image is also retrieved from one or more of the repositories 230A-N and has typically been filtered to eliminate ads and icons. When the user selects a different locale, the publish server 212 communicates with the repositories to obtain an updated set of stories/feeds that are relevant to the selected locale. Generally, the published feeds/stories include temporally relevant content (e.g., news feeds for publishing in real time or near real time). Thus, the publish server 212 establishes communications periodically with the repositories 230 to retrieve updated sets of feeds that have been aggregated by the aggregator engines 204.

In one embodiment, the publish server 212 labels published feeds as having been published already so it does not get published again. In general, the aggregators continuously or periodically aggregate content. For example, the aggregators can collect feeds periodically (e.g., after a predetermined amount of time, every 2 minutes, every 5 minutes, every 10 minutes, etc.). The publish server 212 then retrieves recent content (e.g., temporally relevant content) from the repositories 230 and publishes them.

In one embodiment, the publish server 212 performs fuzzy matching on titles of feeds to be published and feeds that have been published to detect similar content that has previously been published. For example, fuzzy matching (e.g., Levenshtien distance) can be performed on feed titles to detect content which may be previously been published.

In general, the publish server 212 retrieves each distinct feed/story once. The publish server 212 can determine whether a story has previously been retrieved for publication by performing a comparison using the normalized feeds since they are of a uniform data structure. Moreover, the publish server 212 can determine the publication time of the content/feed and the aggregation time (e.g., when the feed/content was processed and aggregated by the aggregator engines 204) to determine whether the feed/content is still up to date and temporally relevant.

One embodiment of the host server 200 includes a trending engine 214 coupled to the publish server 212. The trending engine 214 can be implemented, for example, as software embodied in a computer-readable medium or computer-readable storage medium on a machine, in firmware, in hardware, in a combination thereof, or in any applicable known or convenient device or system. The trending engine 214 can be any combination of hardware components and/or software agents able to determine trending data of content or web feed.

The trending engine 214 can data mine trending data of web feeds or selected qualified content. The trending data can be used by the publish server 212 to prioritize placement of feeds or content in the user interface. For example, content or feeds that are more popular or contain trendy content/information are typically shown before less popular content in the user interface. The trending data can include global trends and/or local trends. For example, the trending engine 214 can collect global trending data from third party sites (e.g., GOOGLE trends, TWITTER trends), social networking sites (e.g., MYSPACE, FACEBOOK), etc. Trending data can also include user trends, determined by the trending engine 214 by, for example, logging user action and clicks to find the top read/accessed stories to identify what might be popular and when it is popular.

The components of the host server 200 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the host server 200 without deviating from the spirit of the disclosure.

FIG. 2B depicts a block diagram of the aggregator engine 204 in the host server.

The aggregator engine 204 includes, in one embodiment, a normalizer module, a filter module, a geo-locator, and/or an image detector/filter. Each module has been described with reference to the example of FIG. 2A. Note that additional or less modules can be included without deviating from the spirit of the novel disclosure.

Moreover, the components of the aggregator engine 204 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the host server 200 without deviating from the spirit of the disclosure.

Figure 3:
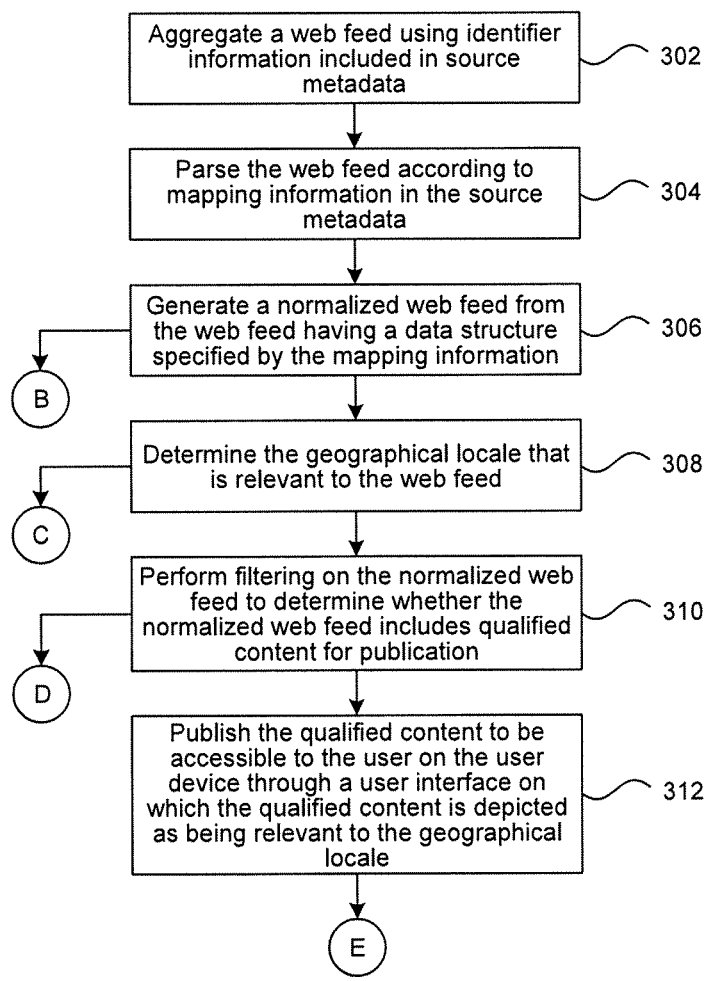
FIG. 3 depicts a flowchart of an example process for publishing qualified content from aggregated web feeds.

FIG. 3 depicts a flowchart of an example process for publishing qualified content from aggregated web feeds.

In process 302, a web feed is aggregated using identifier information included in source metadata. Source metadata can be determined and maintained for each source and stored in a repository (e.g., the listings repository 228 in the example of FIG. 2A). Typically, the source metadata includes a data field for identifier information such as location identifier that can be used by a machine (e.g., an aggregator engine) to locate a web feed or news feed. In addition, the source metadata can include mapping information that specifies a data structure including multiple fields. The mapping information can be used to convert feeds and stories obtained from different sources having different formats to a consistent data structure.

In process 304, the web feed is parsed according to mapping information in the source metadata. In process 306, a normalized web feed is generated from the web feed having a data structure specified by the mapping information. In addition, image association can be performed and is described with further reference to the example flow chart of FIG. 4. Image association is performed to identify an image that can be published with a story or feed in the user interface.

In process 308, the geographical locale that is relevant to the web feed is determined. The geographical locale can be, in one embodiment, determined from the source metadata since each listing typically includes a geographical location identifier. Thus, stories retrieved from a source that is associated with a particular geographical location will typically also be relevant to the same geographical location. In addition, the web feed/stories can be parsed to detect the geographical locale with which the story is relevant. For example, even though a source is associated with the San Francisco Bay Area, each feed or story from the source may be relevant to different cities or neighborhoods in the bay area. Example processes for determining the geographical locale are described with further reference to the example of FIG. 5.

In process 310, filtering is performed on the normalized web feed to determine whether the normalized web feed includes qualified content for publication. Filtering is typically performed for quality assurance, for example, to remove incomplete data, corrupt data, feeds with advertisement, inappropriate content, or any type of content that would generally negatively impact user experience. Example processes for performing filtering are described with further reference to the example of FIG. 6. In process 312, the qualified content is published to be accessible to the user on the user device through a user interface. In one embodiment, in the user interface, the qualified content is depicted as being relevant to the geographical locale.

In process 312, the qualified content is published to be accessible to the user on the user device through a user interface. In the user interface, the qualified content is depicted as being relevant to the geographical locale. In addition, through the user interface, the user can optionally select to filter the published content by category. For example, for published news feeds, the user can select to view sports related news, business news, articles related to travel, entertainment news, art reviews, etc.

Figure 4:
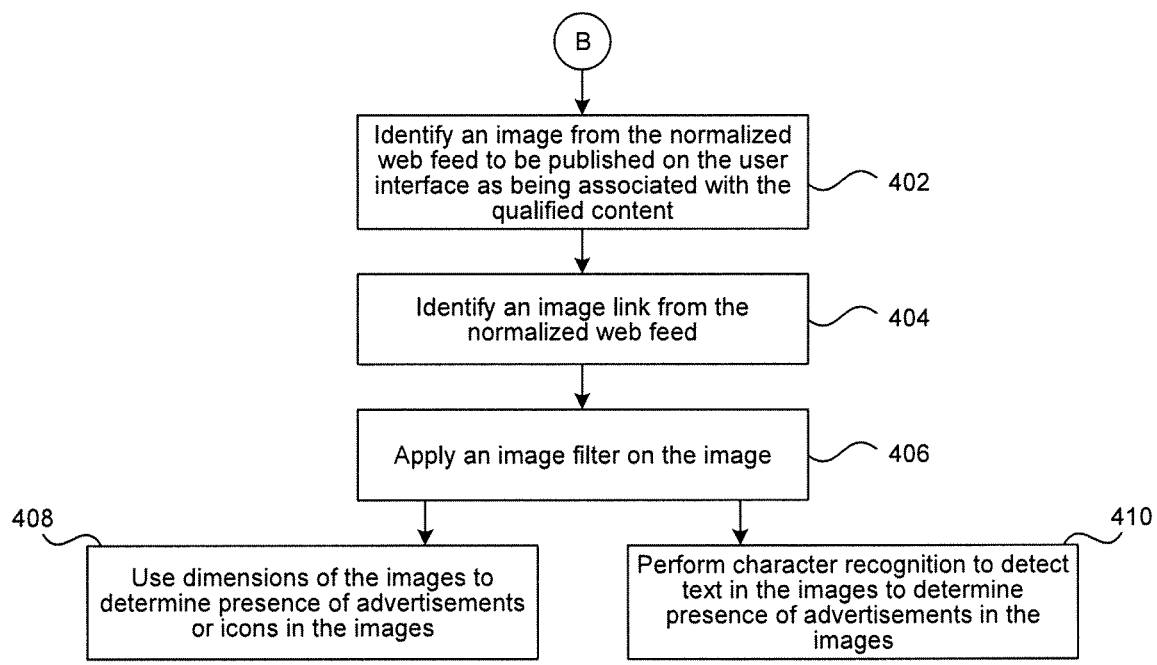
FIG. 4 depicts a flowchart of an example process for performing image association and image filtering for aggregated web feeds.

FIG. 4 depicts a flowchart of an example process for image association and image filtering of web feeds.

In process 402, an image is identified from the normalized web feed to be published on the user interface as being associated with the qualified content, for example, using an image link identified from the normalized web feed, as in process 404.

In process 406, an image filter is applied on the image. Image filters can typically be applied to filter out images which may not be relevant to the web feed. In process 408, dimensions of the images are used to determine presence of advertisements or icons in the images. For example, the width to height ration may be used to identify banner advertisements. In addition, images with dimensions below a certain threshold may be identified as likely being an icon, rather than an image relevant to the feed.

In process 410, character recognition is performed to detect text in the images to determine presence of advertisements in the images. In one embodiment, images with detected text are filtered out since the likelihood of images with text to be an advertisement or to include promotional content is higher than images without text. In some instances, content of the text in the images may be determined to further refine the filtering process.

Figure 5:
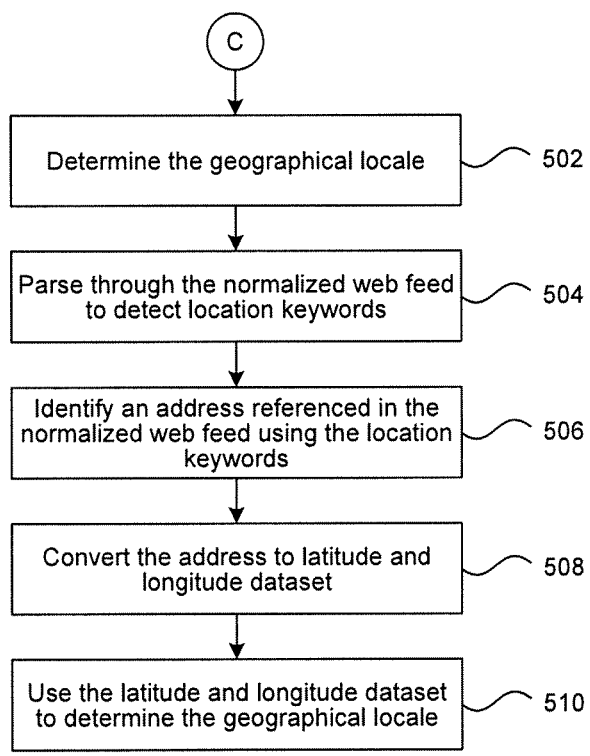
FIG. 5 depicts a flowchart of an example process for determining the geographical locale that is relevant to the web feed.

FIG. 5 depicts a flowchart of an example process for determining the geographical locale that is relevant to the web feed.

To determine the geographical locale, in process 504, the normalized web feed is parsed to detect location keywords. In process 506, an address referenced in the normalized web feed is identified using the location keywords. In process 508, the address is converted to latitude and longitude dataset. In process 510, the latitude and longitude dataset is used to determine the geographical locale.

Figure 6:
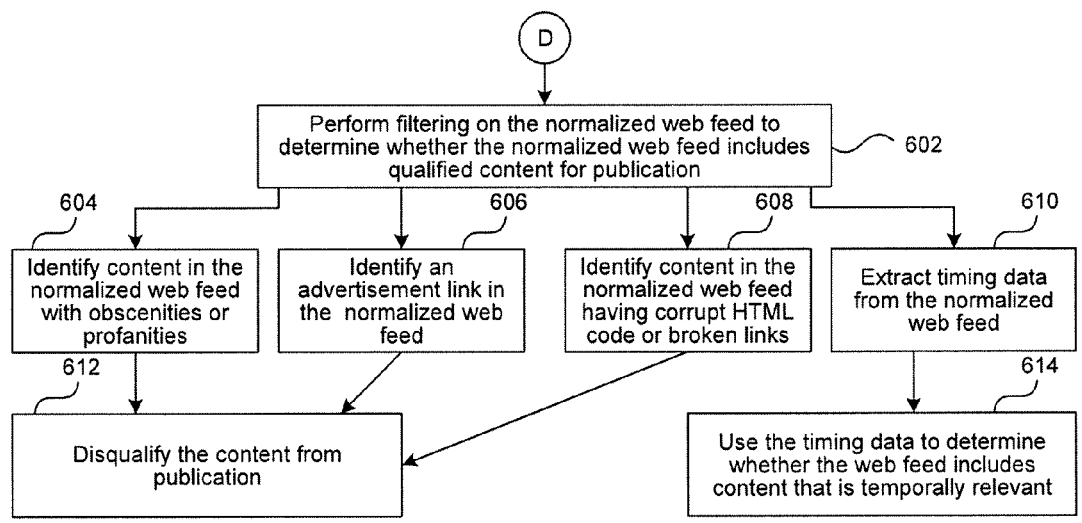
FIG. 6 depicts a flowchart of an example process for filtering a normalized web feed to determine whether qualified content exists for publication.

FIG. 6 depicts a flowchart of an example process for filtering the normalized web feed to determine whether qualified content exists for publication.

To perform filtering on the normalized web feed, in process 604, content in the normalized web feed that has been identified with obscenities or profanities is disqualified from publication, in process 612. In addition, in process 606, if an advertisement link is identified in the normalized web feed, the content is also disqualified from publication. In process 608, if the normalized web feed is identified as having corrupt HTML code or broken links, the content is also disqualified from publication. In process 610, timing data is extracted from the normalized web feed. In process 614, the timing data is used to determine whether the web feed includes content that is temporally relevant.

Figure 7:
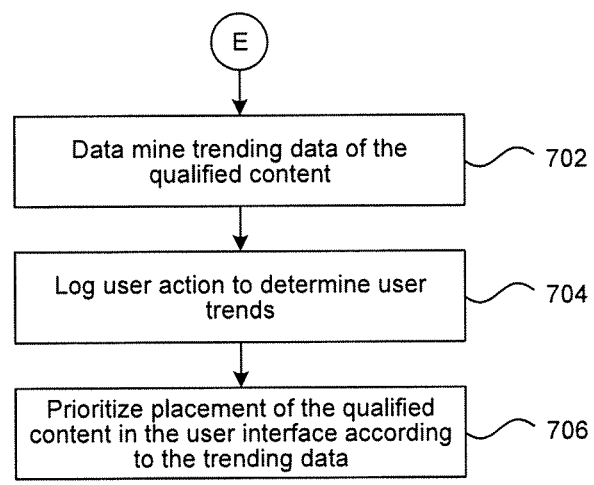
FIG. 7 depicts a flowchart of an example process for determining trending data of the qualified content.

FIG. 7 depicts a flowchart of an example process for determining trending data of the qualified content.

In process 702, trending data of the qualified content is data mined. In process 704, user action is logged to determine user trends. In process 706, placement of the qualified content in the user interface is prioritized according to the trending data.

Figure 8:
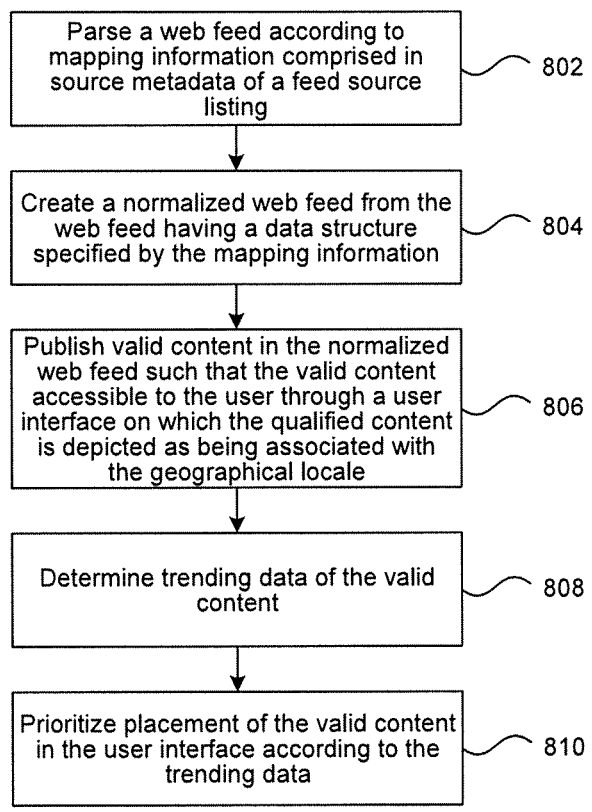
FIG. 8 depicts a flowchart of an example process for publishing web feeds relevant to a geographical locale collected from multiple sources.

FIG. 8 depicts a flowchart of an example process for publishing web feeds relevant to a geographical locale collected from multiple sources.

In process 802, a web feed is parsed according to mapping information comprised in source metadata of a feed source listing. The web feed can be aggregated from a third party content provider or third party host (e.g., a blog, a forum, a social networking site, etc.). For example, using identifier information included in the source metadata of the feed source listing, web feeds can be aggregated from identified web locations. The feed source listing typically includes a list of sources associated with source metadata including identifier information or location identifier information.

In addition, source metadata can also include mapping information. In process 804, a normalized web feed is created from the web feed having a data structure specified by the mapping information. The mapping information can include a title field, a summary field, and/or an author field.

In process 806, valid content in the normalized web feed is published such that the valid content accessible to the user through a user interface on which the qualified content is depicted as being associated with the geographical local. Each user can be, for example, by default associated with a particular geographical locale and is thus automatically presented with published feeds relevant to the same locale. The default association may be automatically determined by the user's profile information, the user's profile data on a third party networking site, or specified by the user.

The user can also select to access/view feeds that are associated with a locale different from the one that he/she is associated with. Alternatively, the user can change his/her associated locale to view news feeds relevant to another locale when initially visiting the site. In general, web feeds relevant to any geographical local is available for access by any user of any locale but by default, the user is presented with news for the locale that he/is associated with.

The valid content can be identified by performing content filtering on the normalized web feed. For example, content with ads or corrupt code can be removed. In addition, feeds with no content, incomplete content, broken links, or inappropriate content can also be removed.

In process 808, trending data of the valid content is determined. For example, trending data can be data mined and can include global and/or local trending data. Global trending data can be collected from third party sites or social networking sites. In addition, user action, clicks, shares, views, can be logged to determine user trends, locally and/or globally. In process 810, placement of the valid content in the user interface is prioritized according to the trending data. For example, content or news feeds with trends may be ranked higher and published with higher priority in the user interface.

FIG. 9 illustrates an example of a user interface 900 showing published news feeds 902 that are relevant to a particular geographical locale.

The particular geographical locale can be associated with the user by default based on profile data of the user. The user can also click on "Try a different City" to see a listing of news feeds from another locale. In general, the published feeds are temporally relevant. In addition to listing a publication of news feeds 902, the user interface can also optionally include one or more of the following: a section for active stories 904, a weather section 906, and an activity section 908. For example, the active stories portion 904 can include stories with comments or popular stories. The activity section 908 can show the feeds/stories that other users or friends of the user has recently clicked on or viewed.

Figure 10B:
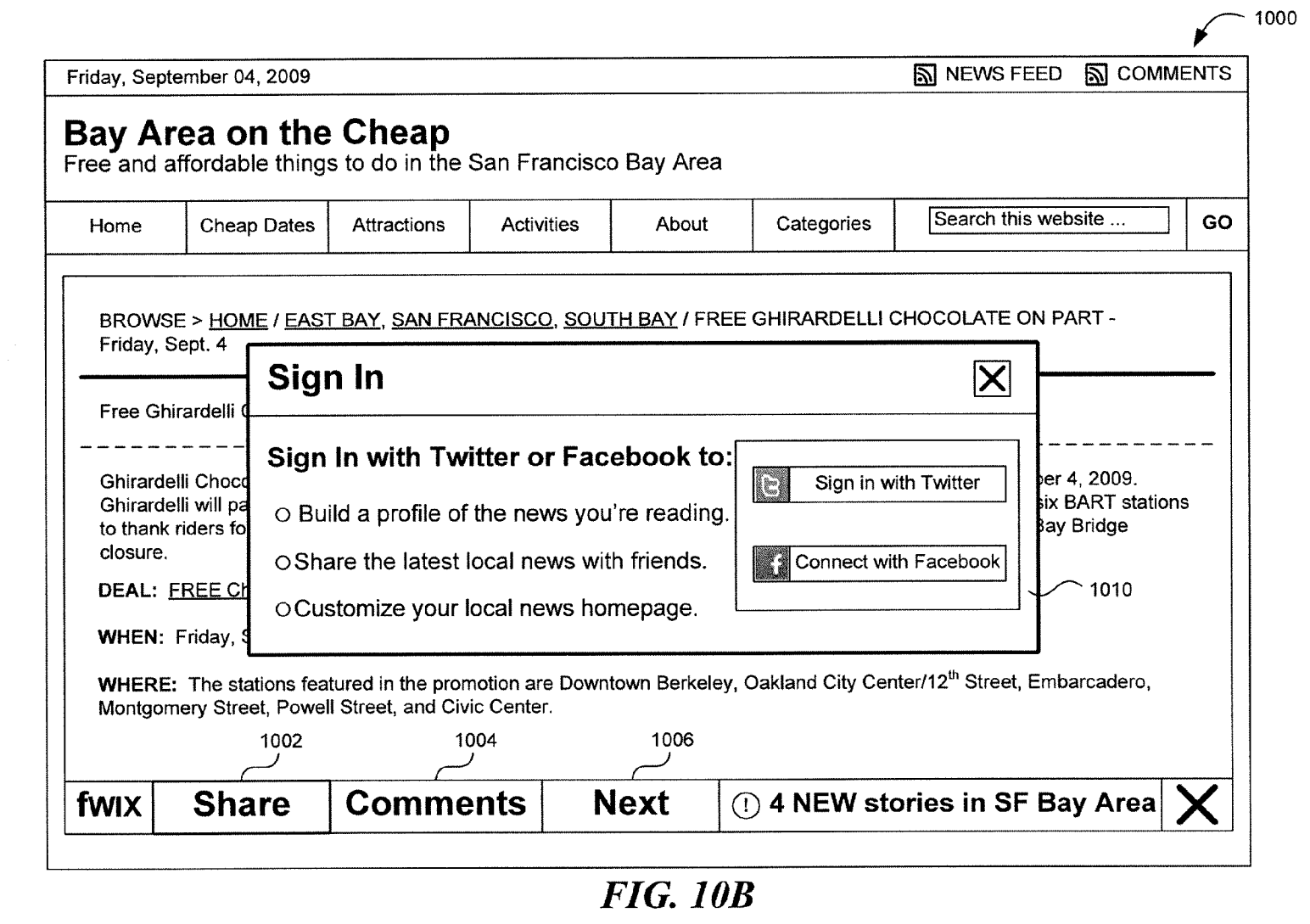
Figure 10C:
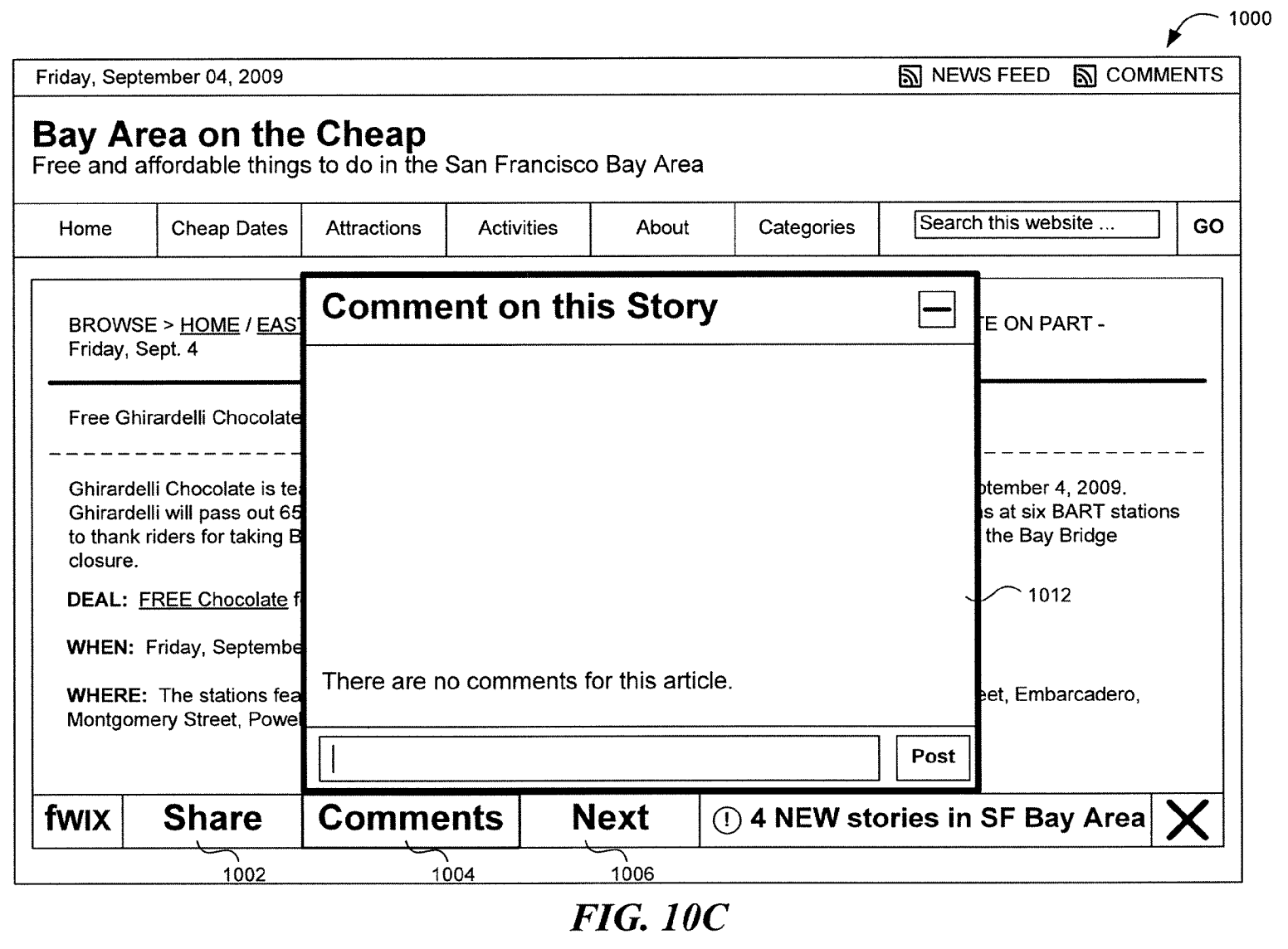

When a published feed 902 is selected by a user, the site can bring the user to the third party host of the content linked by the feed 902 such that the user can view the content of the selected on the site from which the feed was aggregated. For example, FIG. 10A-C illustrate example screenshots 1000 of a news item which is linked by a published web feed. The content can be overlaid with features in the URL bar to share/comment on the news item, while on the original host site. In some embodiments, the user can close the URL bar and the user may be redirected to the third party host site of the linked content.

For example, as illustrated in FIG. 10B, when a user clicks on the "Share" button 1002, if the user is not currently signed in, a screen allowing the user to select a social network to sign-on through pops up on the user interface. The sharing feature allows the user to share the content with other users on a third-party social networking site. For example, the Share button 1002 can be used by the user to build a profile of news that the user is reading or has read, share the latest local news with friends, and/or to customize the user's news homepage, for example.

The user interface 1000 further includes a commenting feature allowing the user to share comments regarding the content with other users. As illustrated in FIG. 10C, the user can select or click on the "Comments" button 1004 to view comments submitted by other users and/or to post a comment. In addition, the "next" button 1006 can be clicked on by the user to access/view the next feed or article.

FIG. 11A illustrates an example of a user's home page 1100 to a site for accessing published web feeds 1104.

The user can access the published feeds for a particular geographical locale by logging in or remain logged out. When the user is logged in, the site can provide statistical and/or historical information about the user's activities in reading/ accessing feeds. For example, in panel 1102, the user interface provides statistical data about how many stories the user has broken over select periods of time. In panel 1106, the stories that the user has read are listed. In addition, the user can use panel 1108 to customize his/her own personal news paper.

Figure 11C:
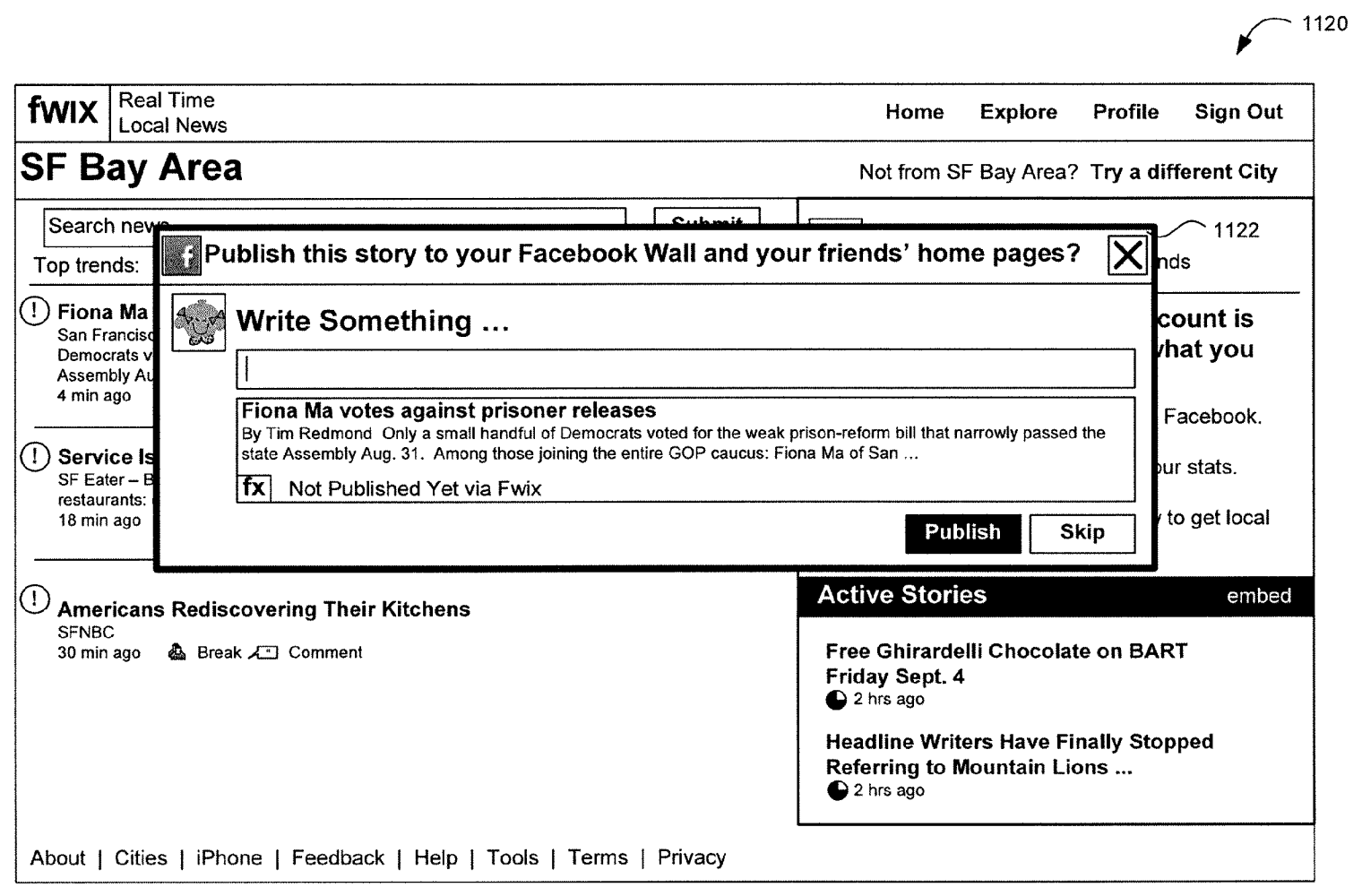

For example, users can implement custom filters such that the content that is of interest to them is presented in a more readily accessible fashion. In addition, the feeds that have been access by a user can be collected on this/her home page and optionally shared with other users (e.g., users with common interest). In some instances, the user can manually delete stories FIG. 11B-C illustrate example screenshots of published news feeds with commenting/sharing features. For example, screenshot 1110 depicts the "Break" feature 1112 and the "Comment" feature 1114 allowing the user to break the feed or to comment on the feed (e.g., the comment can be submitted through text field 1116). Panel 1118 allows the user to access his/he own news access statistics or to break stories to friends through a third party site (e.g., a social networking site). For example, screenshot 1120 of FIG. 11C allows the user to publish a story on a third party networking site (e.g., Facebook) for viewing by his/her friends or other connections. The user also has the option of adding notes to the post.

FIG. 12 illustrates an example of a user interface 1200 showing how access to aggregated web feeds can be added to another site using a widget.

The user (e.g., a developer) can select the color scheme of the widget and optionally the type of content that is displayed (e.g., the user can select the cities from which stories are shown) on another site (e.g., a third party site). In addition, the user can select to apply filters to the stories, the number of stories to publish, what is shown at the title, whether to show images, whether to show the summary, and whether to show the map of the locale, etc.

For example, a widget can be generated based on a selection of characteristics with which the web feed are to be displayed on a third party site. The selections can further include, a specification of geographical locales to which the web feeds are relevant, a specification of a format of the web feeds that are displayed. The site developer can integrate the widget into the third party site and a user can browse through a third party user interface on the third party site to access the web feeds which are relevant to the specified geographical locales. When a user selects a particular feed in the widget, a link to the feed is opened in another user interface such that the user views content of the particular feed on a provider site of the content.

FIG. 13 illustrates an example of a user interface 1300 showing an example list of sources 1302 from which the web feeds are aggregated for the particular geographical locale. In addition, the user interface 1300 can also show the top trends 1304 in the geographical locale (e.g., Seattle). In one embodiment, a user can click on a trend to see related feeds. In general, the trends are also temporally relevant.

Figure 14A:
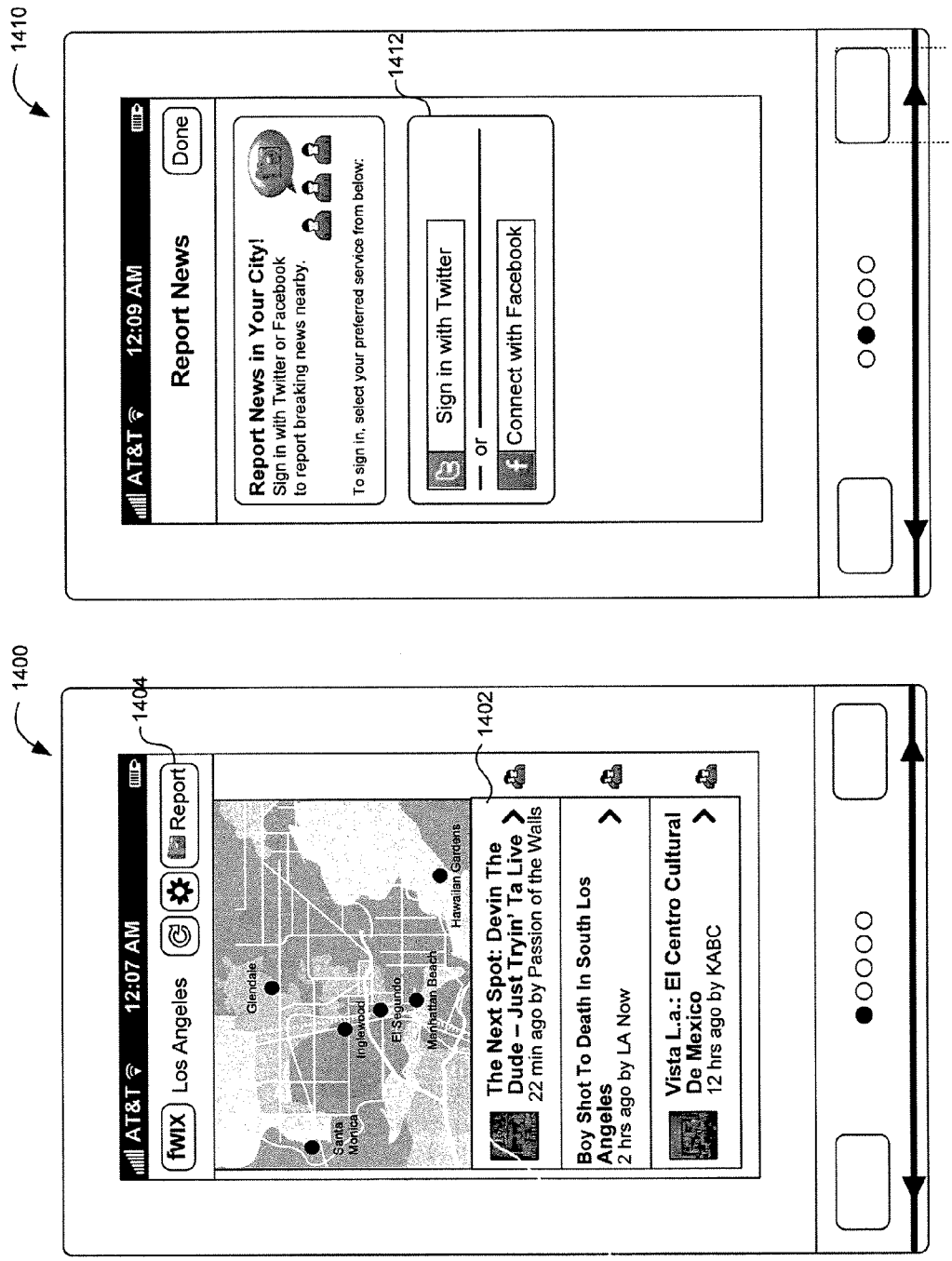
FIG. 14A-B illustrate examples of user interfaces for accessing and reporting news relevant to a geographical locale via a portable device.
Figure 14B:
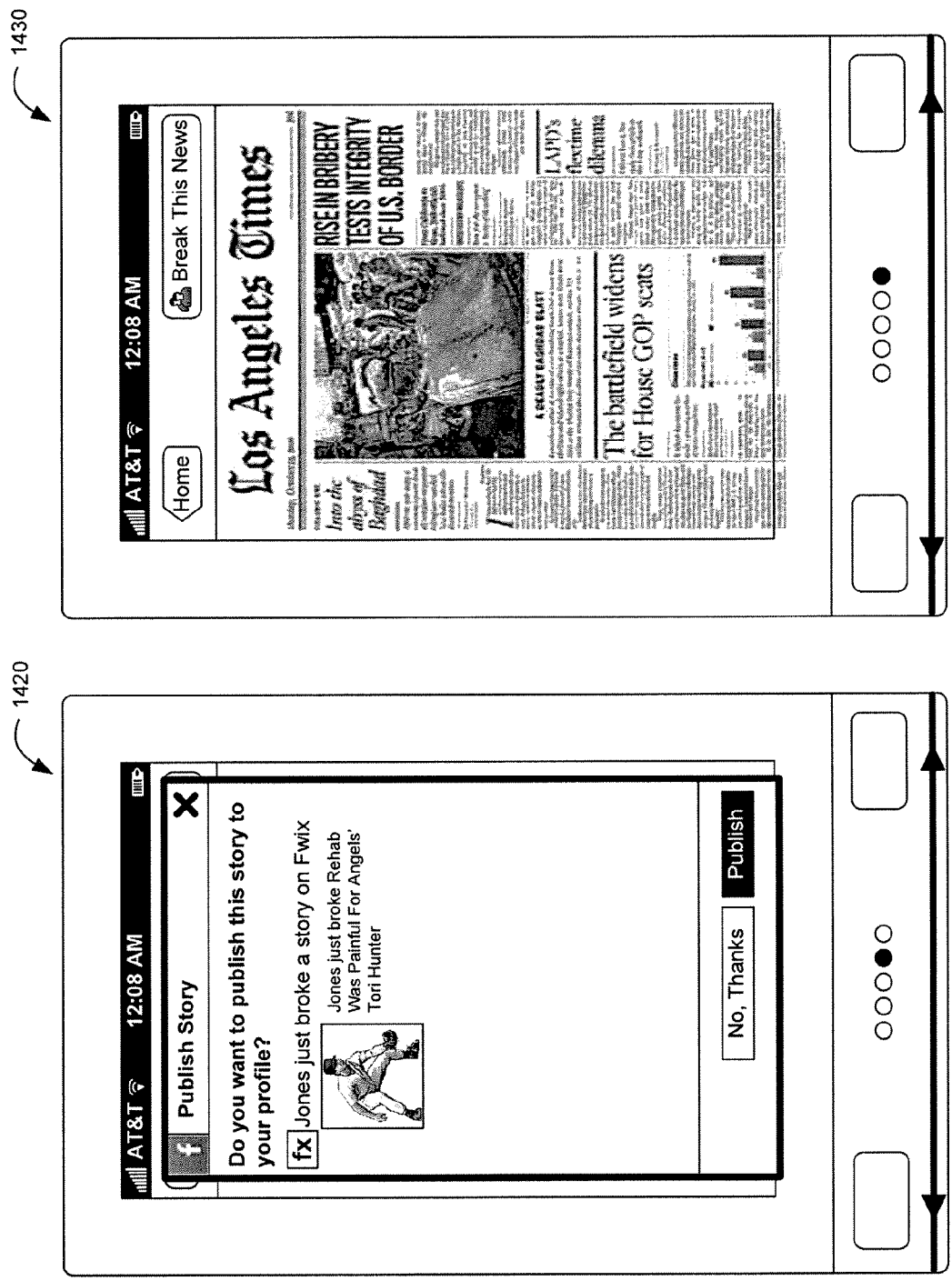
Figure 15:
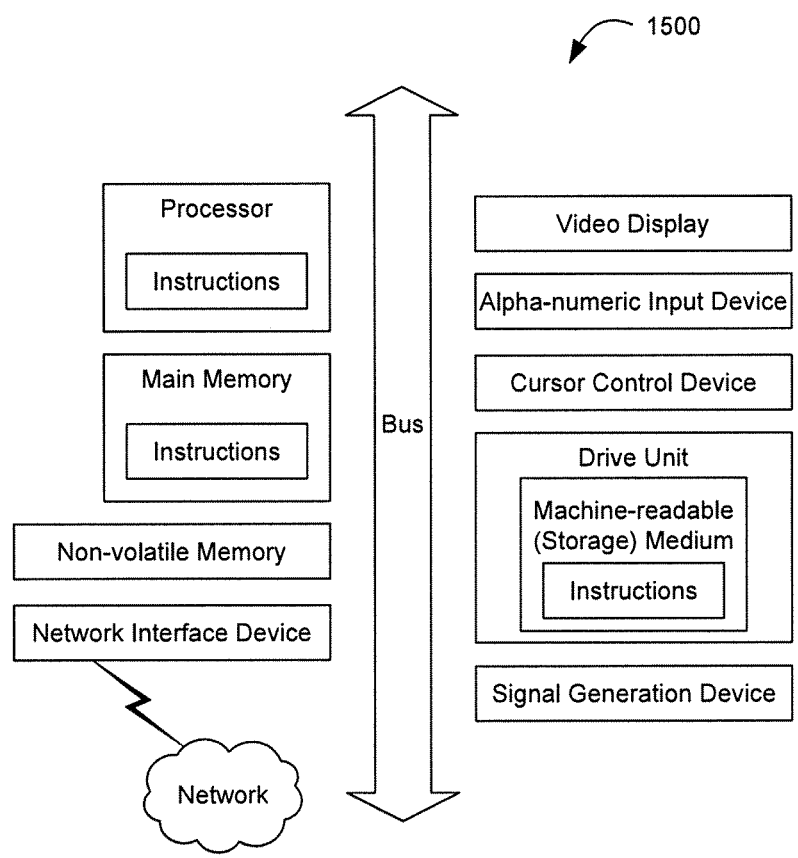
FIG. 15 shows a diagrammatic representation of a machine in the example form of a computer system within which a set of instructions, for causing the machine to perform any one or more of the methodologies discussed herein, may be executed.

FIG. 14A-B illustrate examples of user interfaces for accessing and reporting news relevant to a geographical locale via a portable device.

For example, in user interface 1400, the user can access published feeds 1402 relevant to a particular geographical locale. The local may be detected based on the user's current location as determined by location sensing using the portable device. In addition, the user can report news using the "Report" button 1404. For example, in user interface 1410, the user can select a third party site through which to report news (e.g., FACEBOOK, TWITTER, LINKEDIN, MYS-PACE, etc.). The user interface 1410 can also prompt the user to logon to the third party site through which to share/report news.

For example, user interface 1420 illustrates a screen that confirms with the user that a story is about to be shared via his/her profile on the third party site. User interface 1430 illustrates an example screen showing a news item depicted on a portable device accessed using a published web feed.

FIG. 15 shows a diagrammatic representation of a machine in the example form of a computer system 1500 within which a set of instructions, for causing the machine to perform any one or more of the methodologies discussed herein, may be executed.

In the example of FIG. 15, the computer system 1500 includes a processor, memory, non-volatile memory, and an interface device. Various common components (e.g., cache memory) are omitted for illustrative simplicity. The computer system 1500 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an INTEL PENTIUM microprocessor or MOTOROLA POWER PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, isdn modem, cable modem, token ring interface, satellite transmission interface (e.g. "direct PC"), or other interfaces for coupling a computer system to other computer systems. The interface 208 can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1100 can be controlled by operating system software that includes a file management system, such as a disk operating system. One example of operating system software with associated file management system software is the family of operating systems known as Windows® from MICROSOFT CORPORATION of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an IPHONE, a BLACKBERRY, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, sixth paragraph, will begin with the words "means for".) Accordingly, the applicant reserves the right to add additional claims after filing the application to pursue such additional claim forms for other aspects of the disclosure.

What is claimed is:

1. A method of collecting feeds relevant to a geographical locale from multiple sources to be electronically published to a user through a user device, comprising:

receiving a web feed having source metadata that includes a geographic location identifier, and a plurality of tags including title data, summary data, and text data and in a source format;

generating mapping information for mapping the tags in the source format to a normalized data structure having a title field, a summary field, and a text field, the mapping information generated from (i) a probabilistic model using stored statistical information to assign the plurality of tags to the title field, the summary field and the text field of the normalized data structure, and (ii) heuristic data that assigns the plurality of tags to the title field, the summary field and the text field of the normalized data structure based on a size of each of the plurality of tags;

parsing the web feed according to the mapping information generate a normalized web feed from the web feed, the normalized web feed having the normalized data structure specified by the mapping information;

determining a relevant geographical locale for the normalized web feed by parsing text data in the text field of the normalized web feed to detect location keywords therein;

when the relevant geographic locale differs from the geographic location identifier in the source metadata, identifying a geographic location for the normalized web feed based exclusively on the location keywords;

performing filtering on the normalized web feed to determine whether the normalized web feed includes qualified content for publication; and publishing the qualified content to be accessible to the user on the user device through a user interface on which the qualified content is depicted as being relevant to the geographical location.

2. The method of claim 1, further comprising, identifying an image from the normalized web feed;

wherein, the image is published on the user interface as being associated with the qualified content.

3. The method of claim 2, wherein, the identifying the image comprises:

identifying an image link from the normalized web feed; and applying an image filter on the image.

4. The method of claim 3, wherein, the applying the image filter comprises:

using dimensions of the images to determine presence of advertisements or icons in the images, and deleting the images from the normalized web feed when the presence of advertisements are detected in the images.

5. The method of claim 3, wherein, the applying the image filter comprises:
performing character recognition to detect text in the images to determine presence of advertisements in the images, and deleting the images from the normalized web feed when the presence of advertisements are detected in the images.

6. The method of claim 1, further comprising, data mining trending data of the qualified content and prioritizing placement of the qualified content in the user interface according to the trending data.

7. The method of claim 6, wherein, the trending data includes local trending data and global trending data.

8. The method of claim 7, wherein, the global trending data includes trends collected by third party sites or social networking sites.

9. The method of claim 6, wherein, the trending data includes user trends.

10. The method of claim 9, further comprising, logging user action to determine user trends.

11. The method of claim 1, wherein, the performing the filtering comprises:
identifying content in the normalized web feed with obscenities or profanities; and
disqualifying the content having obscenities or profanities from publication.

12. The method of claim 1, wherein, the performing the filtering comprises:
identifying an advertisement link in the normalized web feed; and
disqualifying the advertisement link from publication.

13. The method of claim 1, wherein, the performing the filtering comprises:
identifying content in the normalized web feed having corrupt HTML code or broken links; and
disqualifying the content having corrupt HTML code or broken links from publication.

14. The method of claim 1, wherein, the performing the filtering comprises:
extracting timing data from the normalized web feed; and
using the timing data to determine whether the web feed includes content that is temporally relevant.

15. The method of claim 1, wherein, the determining the relevant geographical locale further comprises:
converting the location keywords to a latitude and longitude dataset; and
using the latitude and longitude dataset to determine the relevant geographical locale.

16. The method of claim 1, further comprising, using the normalized web feed to ensure that the web feed is aggregated only once.

17. The method of claim 1, wherein, the web feeds include news feeds.

18. The method of claim 1, wherein, the web feeds are temporally relevant.

19. The method of claim 1, wherein, the web feeds include one or more of, RSS feeds, Atom, JSON, and raw XML.

20. A method performed by a computer in communication with a machine-readable storage medium having stored thereon a set of instructions which when executed, causes a processor of the computer to identify and publish web feeds relevant to a geographical locale collected from multiple sources, the method comprising:
receiving a web feed having source metadata that includes a geographic location identifier, and a plurality of tags including title data, summary data, and text data and in a source format;
generating mapping information for mapping the tags in the source format to a normalized data structure having a title field, a summary field, and a text field, the mapping information generated from (i) a probabilistic model using stored statistical information to assign the plurality of tags to the title field, the summary field and the text field of the normalized data structure, and (ii) heuristic data that assigns the plurality of tags to the title field, the summary field and the text field of the normalized data structure based on a size of each of the plurality of tags;
parsing the web feed according to the mapping information, the source metadata and the plurality of tags;
creating a normalized web feed from the web feed, the normalized web feed having the normalized data structure specified by the mapping information;
determining a relevant geographic locale corresponding to the normalized web feed by parsing text data in the text field of the normalized web feed to detect location keywords therein
when the relevant geographic locale differs from the geographic location identifier in the source metadata, identifying the geographic location for the normalized web feed based exclusively on the location keywords;
publishing valid content in the normalized web feed such that the valid content is accessible to the user through a user interface presented on a user computing device on which the qualified content is depicted as being associated with the geographical location;
determining trending data of the valid content; and
prioritizing placement of the valid content in the user interface first according to the geographic location and then according to the trending data.

21. The method of claim 20, wherein, the valid content is identified by performing filtering on the normalized web feed.

22. The method of claim 20, wherein, the web feed is aggregated from a third party host using identifier information included in the source metadata.

23. A system for publishing web feeds relevant to a geographical locale collected from multiple sources, the system, comprising:
one or more client devices connected via a network to a host server;
a listing repository to receive and store web feeds, each web feed having source metadata that includes a geographic location identifier, and a plurality of tags including title data, summary data, and text data and in a source format;
an aggregator engine, coupled to the listing repository, for aggregating the web feeds using the geographic location identifier in the source metadata;
a normalization module in the aggregator engine for generating mapping information for mapping the tags in the source format to a normalized data structure having a title field, a summary field, and a text field, the mapping information generated from (i) a probabilistic model using stored statistical information to assign the plurality of tags to the title field, the summary field and the text field of the normalized data structure, and (ii) heuristic data that assigns the plurality of tags to the title field, the summary field and the text field of the normalized data structure based on a size of each of the plurality of tags; and the normalization module further for parsing the web feeds to generate normalized web feeds having the a normalized data structure;
a parser for determining a relevant geographic locale corresponding to the normalized web feed by parsing text data in the text field of the normalized web feeds to detect location keywords therein and when the relevant geographic locale differs from the geographic location identifier in the source metadata, identifying the geographic location for the normalized web feeds based exclusively on the location keywords;
a filter module in the aggregator engine that filters the normalized web feeds to determine whether the normalized web feeds include qualified stories for publication;
multiple content repositories each coupled to the aggregator engine for storing the qualified stories; and
a publish server coupled to the multiple content repositories for publishing the qualified stories accessible to a user through a user interface on which the qualified content is depicted as being relevant to the geographical location.

24. The system of claim 23, wherein, the qualified stores include news feeds that are published in real time.

25. The system of claim 23, further comprising,
a trending engine coupled to the publish server;
wherein, the trending engine determines trending data of the valid stories.

26. The system of claim 25, wherein, the trending engine data mines local trends and collects global trends from third party sources or social networking sites.

27. The system of claim 26, wherein, each of the multiple content repositories is coupled to the aggregator engine; and
wherein, the aggregator engine stores the valid stories in redundancy on each of the multiple content repositories.

28. The system of claim 25, wherein, the trending engine collects user action data to determine user trends.

29. The system of claim 25, wherein, the publish server prioritizes placement of the valid content in the user interface according to the trending data.

30. The system of claim 23, wherein, each of the multiple content repositories stores the valid stories in redundancy.

31. A method for collecting feeds relevant to a geographical locale from multiple sources to be electronically published to a user through a user device, comprising:
receiving a web feed having source metadata that includes a geographic location identifier, and a plurality of tags including title data, summary data, and text data and in a source format;
generating mapping information for mapping the tags in the source format to a normalized data structure having a title field, a summary field, and a text field, the mapping information generated from (i) a probabilistic model using stored statistical information to assign the plurality of tags to the title field, the summary field and the text field of the normalized data structure, and (ii) heuristic data that assigns the plurality of tags to the title field, the summary field and the text field of the normalized data structure based on a size of each of the plurality of tags;
parsing the web feed according to the mapping information to generate a normalized web feed from the web feed, the normalized web feed having the normalized data structure specified by the mapping information;
determining a relevant geographical locale for the normalized web feed by parsing text data in the text field of the normalized web feed to detect location keywords therein; and when the relevant geographical locale differs from the geographic location identifier in the source metadata, identifying the relevant geographical locale as a relevant geographic location for the normalized web feed based on the location keywords;
filtering the normalized web feed to determine whether the normalized web feed includes qualified content for publication based on the relevant geographic location; and
publishing the qualified content to the user through a user interface wherein the qualified content is depicted as being from the relevant geographic location.

32. A method of using a device to access feeds that are relevant to a geographical locale aggregated from multiple sources through a host site, comprising:
receiving a first set of web feeds and a second set of web feeds, each web feed of the first and second sets of web feeds having source metadata that includes a geographic location identifier, and a plurality of tags including title data, summary data, and text data and in a source format;
generating mapping information for mapping the tags in the source format to a normalized data structure having a title field, a summary field, and a text field, the mapping information generated from (i) a probabilistic model using stored statistical information to assign the plurality of tags to the title field, the summary field and the text field of the normalized data structure, and (ii) heuristic data that assigns the plurality of tags to the title field, the summary field and the text field of the normalized data structure based on a size of each of the plurality of tags;
determining relevant geographic locales corresponding to the first set of web feeds and the second set of web feeds by parsing text data in the text fields of the web feeds to detect location keywords therein; and
when the relevant geographical locales differ from the geographic location identifier in the source metadata identifying the geographic locations of the web feeds based exclusively on the location keywords;
retrieving first relevant web feeds from the first set and second set of web feeds relevant to a first geographical locale;
when the first geographic locale corresponds to a geographic locale of a user, displaying the first relevant web feeds on a user interface when the user visits the host site;
in response to the user selecting a particular feed in the first relevant feeds, opening a link to the particular feed in a second user interface such that the user views content of the particular feed on a provider site of the content;
wherein, the second user interface includes a widget having a sharing feature allowing the user to share the content with other users;
retrieving trended feeds related to a detected trend in response to the user selecting the detected trend and displaying the trended feeds in the user interface;
wherein, the trended feeds are also relevant to the first geographical locale based on the location keywords; and
in response to the user selecting a second geographical locale through the user interface, retrieving second web feeds relevant to the second geographical locale based on the location keywords and displaying the second relevant web feeds in the second user interface.

33. The method of claim 32, wherein, the sharing feature allows the user to share the content with other users on a third-party social networking site.

34. The method of claim 32, wherein, the user interface further includes a commenting feature allowing the user to share comments regarding the content with other users.

35. The method of claim 32, wherein, the first geographical locale is associated with the user by default based on profile data of the user.

36. The method of claim 32, wherein, the first and second set of web feeds are temporally relevant.

37. The method of claim 32, wherein, the trended feeds are temporally relevant.

\* \* \* \* \*